(12) United States Patent
Eads et al.

(10) Patent No.: US 10,915,500 B2
(45) Date of Patent: Feb. 9, 2021

(54) METHOD AND SYSTEM FOR HISTORICAL CALL LOOKUP IN DISTRIBUTED FILE SYSTEMS

(71) Applicant: Verizon Patent and Licensing Inc., Arlington, VA (US)

(72) Inventors: David C. Eads, Cumming, GA (US); Robert Glenn Capps, Jr., Alpharetta, GA (US); Edward M. Foltz, Cumming, GA (US); Hema G. Chhatpar, Cumming, GA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 256 days.

(21) Appl. No.: 16/218,595

(22) Filed: Dec. 13, 2018

(65) Prior Publication Data
US 2020/0192865 A1 Jun. 18, 2020

(51) Int. Cl.
| G06F 7/02 | (2006.01) |
| G06F 16/00 | (2019.01) |
| G06F 16/13 | (2019.01) |
| G06F 16/14 | (2019.01) |
| G06F 16/18 | (2019.01) |
| G06F 16/182 | (2019.01) |
| G06F 16/24 | (2019.01) |

(52) U.S. Cl.
CPC .......... *G06F 16/13* (2019.01); *G06F 16/152* (2019.01); *G06F 16/182* (2019.01); *G06F 16/1873* (2019.01); *G06F 16/144* (2019.01); *G06F 16/24* (2019.01)

(58) Field of Classification Search
CPC combination set(s) only.
See application file for complete search history.

(56) References Cited

U.S. PATENT DOCUMENTS

| 9,633,106 B1 * | 4/2017 | Saurabh | ................ G06F 16/355 |
| 2017/0041296 A1 * | 2/2017 | Ford | ................... H04L 63/0421 |
| 2017/0254640 A1 * | 9/2017 | Kalkbrenner | ...... G01B 11/0608 |

* cited by examiner

*Primary Examiner* — Bruce M Moser

(57) ABSTRACT

Systems and methods described herein facilitate the search and presentation of historical data for wireless network usage and provide a mechanism for high-redundancy, low-latency record retrieval of data from large data sets. Network devices divide data for a historical data store into separate record type groups, store metadata for each record type in an application database, partition each record type group by date in a historical record database that is different from the application database, and form, within each date partition, buckets of common hash values of a key parameter from each record. When a user performs a query, the network devices generate a record-specific query form based on the record type metadata to obtain lookup parameters; generate a search hash value using a key parameter from the lookup parameters; and generate a query expression based on the record type, lookup parameters, and the search hash value.

20 Claims, 6 Drawing Sheets

METHOD AND SYSTEM FOR HISTORICAL CALL LOOKUP IN DISTRIBUTED FILE SYSTEMS

BACKGROUND

Service providers may rely on large-scale data systems to store records of billions of customer transactions. Different data sets within these systems may vary in size from gigabytes to petabytes. The large data sizes of these systems preclude use of in-memory database systems. Instead, hard disk storage (e.g., one or more magnetic disk drives) is needed, which typically includes higher latencies and more complex instruction sets to access stored data.

DETAILED DESCRIPTION OF THE PREFERRED EMBODIMENTS

Figure 1:
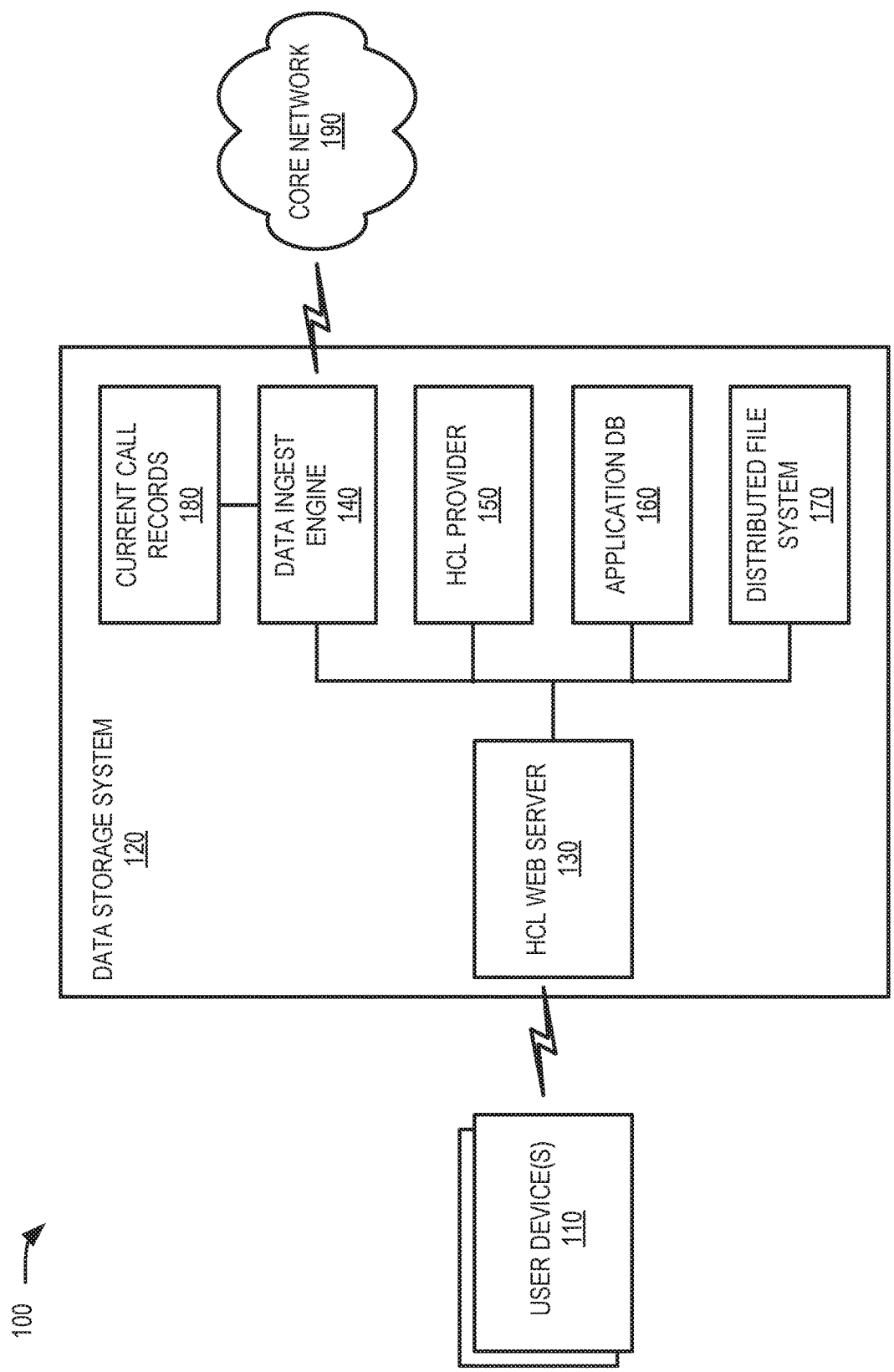
FIG. 1 is a diagram illustrating an exemplary network environment in which systems and methods described herein may be implemented.

The following detailed description refers to the accompanying drawings. The same reference numbers in different drawings may identify the same or similar elements. Also, the following detailed description does not limit the invention.

Large data systems, such as mobile call data systems may include detailed records of customer network usage, of which there may be dozens of different record types (e.g., cellular voice call records, text message records, toll-free call records, toll-free data records, etc., referred to herein collectively as "call records" or individually as different "call record types"). Data housed in such systems typically includes records from the most recent two or three months to enable relatively quick searching. This recent data may be stored, for example, in an in-memory database system, which may be used for a "current" data lookup. When users (e.g., network administrators, billing specialists, compliance agents, etc.) require records further back than the "current" retention period, another option is a larger dataset of historical records, which may be stored for a year or more back from the current day.

Due to the large data volumes (which may be measured in terms of terabytes and/or petabytes), "historical" records are stored in separate storage systems, which typically involve higher latencies and more complex instruction sets to access/query the stored data. Thus, queries of historical records can consume significantly more time and system resources than queries of current records. For large service providers, thousands of historical queries may be performed daily in response to customer service issues, legal requests, etc. Current queries in traditional relational database systems can take several hours to search a large historical data set with unstructured data. Numerous overlapping queries for historical call records can result in even slower response times and bog down system resources.

Furthermore, new network features and usage types are continually being added to the mobile network. These new features or services need to be incorporated into existing data systems going forward, including current and historical records. Thus, it is preferable to use a data system that is extensible to incorporate new types of records and/or new fields of existing records with minimal rework or new code.

Systems and methods described herein facilitate the search and presentation of historical data for reporting network usage and provide a mechanism for high-redundancy, low-latency record retrieval of data from very large data sets. Network devices divide call data for a historical data store into separate record type groups; store metadata for each record type metadata in an application database; partition each record type group by date in a historical record database that is different from the application database; and form, within each date partition, buckets of common hash values of a key parameter from each call record. When a user performs a query, the network devices generate a record-specific query form based on the record type metadata to obtain lookup parameters; generate a search hash value using a key parameter from the lookup parameters; and generate a query expression based on the record type, lookup parameters, and the search hash value.

FIG. 1 is a diagram illustrating an exemplary network environment 100 in which systems and methods described herein may be implemented. As shown in FIG. 1, environment 100 may include one or more user devices 110, a data storage system 120 and a core network 190.

The number, the type, and the arrangement of network devices in environment 100, as illustrated and described, are exemplary. A network device, a network element, or a network function (referred to herein simply as a network device) may be implemented according to one or multiple network architectures (e.g., a client device, a server device, a peer device, a proxy device, a cloud device, a virtualized function, and/or another type of network architecture (e.g., Software Defined Networking (SDN), virtual, logical, network slicing, etc.). Additionally, a network device may be implemented according to various computing architectures, such as centralized, distributed, cloud (e.g., elastic, public, private, etc.), edge, fog, and/or another type of computing architecture. The number, the type, and the arrangement of networks in environment 100, as illustrated and described, are exemplary. Furthermore, while examples used herein refer to network devices for call record data, the systems and methods described herein may also be applied to any large-scale records data.

User devices 110 may include any type of communications device capable of exchanging information with data storage system 120. User devices 110 may enable users to send/receive messages, view content, and/or interact with other devices. For example, user devices 110 may include a personal computer (e.g., a laptop or desktop PC), a tablet computer, a smart phone, or other types of computational or communication devices that can communicate with devices in data storage system 120. In one implementation, each user device 110 may include a web browser or other software to enable user device 110 to access web sites or other information from data storage system 120 (e.g., historical call lookup (HCL) web server 130 hosted by data storage system 120). In one implementation, a user device 110 includes, or is linked to, an application on whose behalf user device 110 communicates with data storage system 120 to read or query file data.

Data storage system 120 may include one or more network devices, or other types of computation or communication devices, that may store, process, search, and/or provide information in a manner described herein. In some implementations, data storage system 120 may include a data storage system for a wired and/or wireless network controlled or operated by, for example, a telecommunications company that provides telephone and/or data access to subscribers. Thus, in one implementation, data storage system 120 may include data for subscribers' use of a radio access network for a long-term evolution (LTE) network, a Fourth Generation (4G) network, a Fifth Generation (5G) network, and/or another 3rd Generation Partnership Project (3GPP) network. According to implementations described herein, data storage system 120 may include one or more servers (e.g., computer systems and/or applications) capable of maintaining a large-scale, random read/write-access data store of subscriber call data.

A shown in FIG. 1, data storage system 120 may include a historical call lookup (HCL) web server 130, a data ingest engine 140, an HCL provider 150, an application database (DB) 160, distributed file system 170, and current call records 180. In other implementations additional network devices (not shown) may be included in data storage system 120.

HCL web server 130 may include one or more devices, such as computer devices, network devices, and/or server devices, which solicit, receive, and facilitate search queries, for historical call data, from user devices 110. In one implementation, HCL web server 130 may be associated with a telecommunication services provider that provides telecommunications services (e.g., messaging services, data services, voice services, etc.) to subscribers using core network 190. In one implementation, HCL web server 130 may restrict access to data storage system 120 to verified users of user devices 110. For example, HCL web server 130 may receive login requests from user device 110 and verify credentials from user device 110 before providing data to user device 110. In one implementation, HCL web server 130 may structure queries from users to facilitate faster responses. For example, HCL web server 130 may provide one search page and one results page for each available call record type in distributed file system 170.

Data ingest engine 140 may be configured to receive subscriber call data from one or more network devices of core network 190. For example, network devices in core network 190 may collect call data for each subscriber call or other type of network connection and provide the call data to data ingest engine 140. According to implementations described herein, data ingest engine 140 may apply a generic two stage dynamic ingestion process to data from core network 190. In the first stage, a current record collection process stores call data for a two-or three month window (e.g., in current call records 180) for in-memory searches. In the second stage (which may be in parallel or serial with the first stage), a historical records ingest process ingests all data (including the current data) into historical call tables (e.g., distributed file system 170).

As described further herein, the historical records ingest process handles all different data types regardless of size, dynamically adjusts ingestion parameters and execution based on data attributes for proper ingestion, requires no custom code per record type, and allows insertion of custom transformation Structured Query Language (SQL) when needed. According to one implementation, the historical records ingest all call data from core network 190 into different "buckets." Table bucket sizes can be tuned so that each bucket only contains one block of data up to a configurable maximum size that is selected to minimize query latencies. According to one implementation, a bucket size may be limited to no more than about one gigabyte (GB) where the entire data set of historical records may include thousands of terabytes.

HCL provider 150 may include one or more devices, such as computer devices, network devices, and/or server devices, which accepts and processes requests that originate from the HCL web server 130. In one implementation, HCL provider 150 may perform a scan process to scan for incoming requests (e.g., on a particular port) and a query execution process to create a query expression from the search criteria and execute the query expression. According to one implementation, HCL provider 150 may further include a status monitor, such as a minimalistic web server embedded in the application. The status monitor may serve one web page on a particular port (different from the port used for the scan) as well as a simple web service that can be used by other applications. The status monitor may provide information for load balancing over several HCL providers 150 by checking a load status from each respective status monitor.

Application database (DB) 160 may include data that enables HCL web server 130 and HCL provider 150 to communicate with each other, save user-specific information, and create dynamic content. Data types stored in application database 160 may include, for example, request information, record-type reference data, output format information, and result data.

The request information of application database 160 may include information about successfully-submitted requests. The request information may include a user identifier, search terms and other search parameters, queue status, projected query times, etc.

The record-type reference data stored in application database 160 allows HCL web server 130 and HCL provider 150 to be programmed generically so that adding or modifying information about call record types requires minimal changes to existing, running code. Reference data may include, for example, information about which database and/or table within distributed file system 170 holds the data for a particular call record type, an extended schema for that table that includes searchability and display information, and details about hashing for the table (e.g., particular hash functions and key parameters to use). HCL web server 130 may use this reference data to generate a query page dynamically for a call record type, using the stored searchability and display information, as well as to allow the output format screens to have the correct options for available columns. HCL provider 150 may also use this reference data to generate query expressions based on the call record type in a request.

Output format information may include personal output formats for a call record type. Result data may include results extracted from distributed file system 170 so that querying within existing results is simpler and faster without having to search distributed file system 170 again.

Distributed file system 170 (also referred to herein as an historical record database) may include one or more mass storage devices where data ingest engine 140 stores historical records for mass lookup. For example, call data may be partitioned by date and hashed on subscriber phone numbers (e.g., mobile directory numbers (MDNs)), Internet Protocol (IP) address, other device identifiers, subscriber account numbers, or other key parameters to reduce search latency. As noted above, call data may be ingested into buckets of a limited, configurable size. Distributed file system 170 may be ingested at the same time as the current call records 180, so that the date range of historical data available in distributed file system 170 includes the date range of available data in current call records 180. According to one implementation, each bucket may represent a particular hash value, where the number of buckets may equal the number of possible hash values permitted by the hash function. For example, where a hash function provides for values from 1 to 2048 for different MDNs, distributed file system 170 may include 2048 MDN buckets for each particular day. Other hash functions with more or fewer resultant values may be used.

Current call records 180 may include a smaller time period (e.g., a one to three months moving window) of call records made available for in-memory searches. Current call records 180 may include an in-memory database where recent call records are stored in main memory to facilitate faster response times. Call records may be loaded, for example, into memory in a compressed, non-relational format. In contrast with distributed file system 170, current call records 180 may use different or fewer partitions, or no partitions. Current call records 180 may be stored in a different storage system (e.g., cached) than distributed file system 170.

Although not shown in FIG. 1, network environment 100 may include a variety of other components, such as one or more dedicated servers or hubs for other types of queries (e.g., for current data). As used herein, a component may include hardware or a combination of software and hardware.

Figure 2:
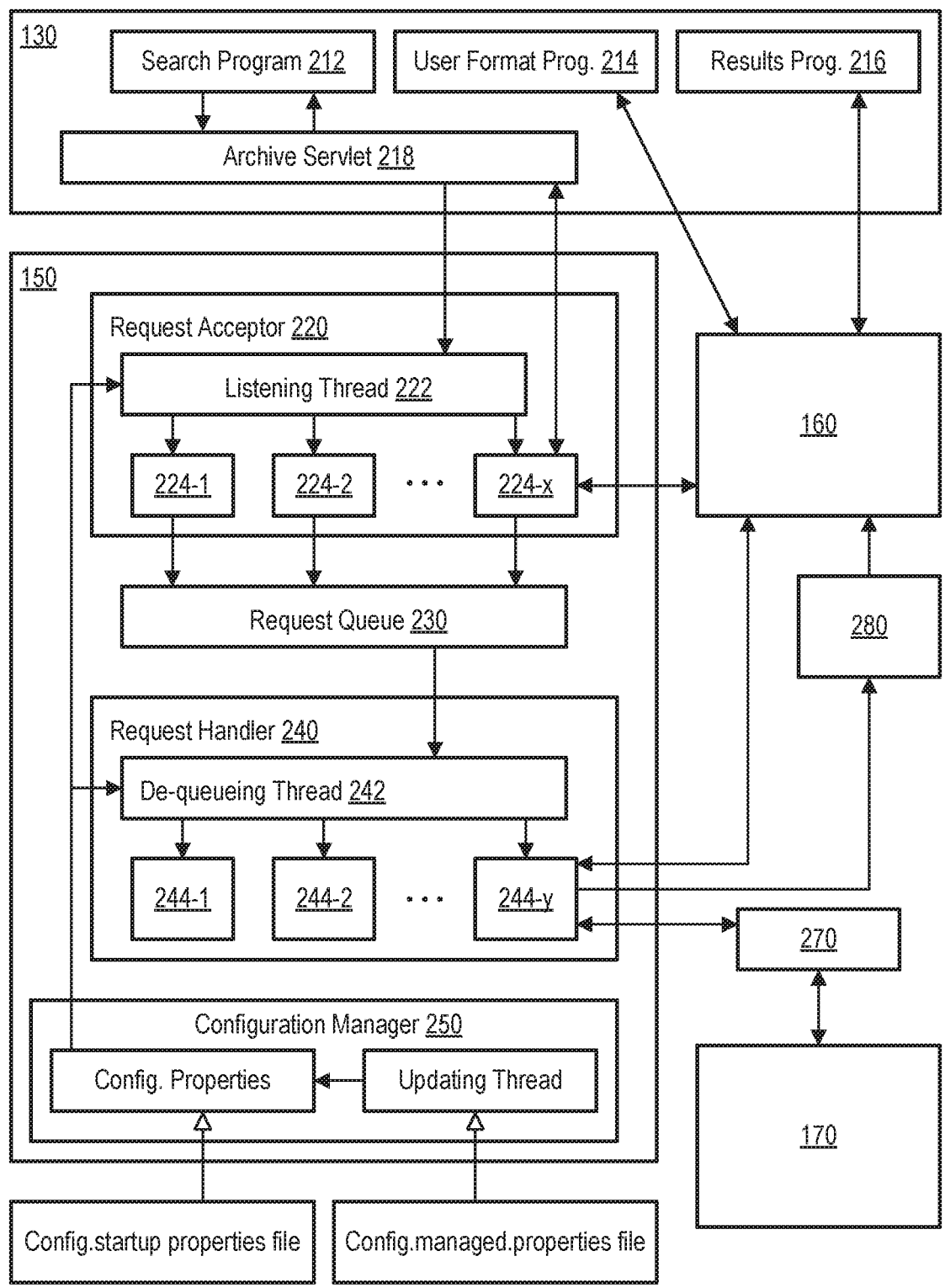
FIG. 2 is an exemplary diagram illustrating some components of the data storage system of FIG. 1.

FIG. 2 is an exemplary diagram illustrating some components of a data storage system 120 and their interactions. As shown in FIG. 2, data storage system 120 may include HCL web server 130, HCL provider 150, application database 160, distributed file system 170, a query expression processor 270, and external table data files 280. Communication links shown in FIG. 2 (not labeled) are illustrative communication links to support a user query of distributed file system 170.

As shown in FIG. 2, HCL web server 130 may include a search program 212, a user format program 214, a results program 216, and an archive servlet 218. A user (e.g., using user device 110) may select a type of record for which to conduct a search. In response to the selected record type, user format program 214 may retrieve metadata from application database 160 about the record type the user has selected to search. Using the retrieved metadata for the selected record type, search program 212 may generate a search template with fields to receive user query input. Search program 212 may receive the search terms from the user and pass the search terms to archive servlet 218, which pulls out the query parameters and forwards the query parameters to HCL provider 150.

HCL provider 150 receives query parameters from HCL web server 130 and generates a query expression (e.g., an APACHE HIVE expression) for distributed file system 170. Based, for example, on the record type, HCL provider 150 may identify a query expression that will minimize the search processing by query expression processor 270. More particularly, HCL provider 150 may use the ingestion format of distributed file system 170 to exclude as many buckets as possible from the search of distributed file system 170. Using the same hash function that data ingest engine 140 uses to create buckets in distributed file system 170, HCL provider 150 may build a query that will force use of hash elimination (e.g., by query expression processor 270) to exclude searching buckets that are not mathematically possible to satisfy the user request. HCL provider 150 may submit the query expression to query expression processor 270.

As shown in FIG. 2, HCL provider 150 may include a request acceptor 220, a request queue 230, a request handler 240, and a configuration manager 250. Request acceptor 220 may receive query parameters (e.g., record type, search term(s), search interval, etc.) from HCL web server 130 and manage a request flow.

Request acceptor 220 (e.g., a listening thread 222) may scan for search requests by listening on a particular port on the HCL web server 130. When a search request is received, request acceptor 220 (e.g., an available queuing task 224) validates the search criteria using, for example, record-type reference data from application database 160. If the request passes validation, request acceptor 220 may assign a request ID, which is stored in application database 160 for tracking and then passed back to HCL web server 130. Request acceptor 220 may then place the request in an in-memory queue (e.g., request queue 230).

Request queue 230 may be monitored by request handler 240 (e.g., de-queuing thread 242) in conjunction with several processing threads (e.g., processing thread 244), so that when a processing thread is free, the available processing thread 244 takes the next request from the request queue 230.

Request handler 240 (e.g., processing thread 244) may generate the query expression with a search hash value based on the ingest hash function (e.g., the same hash function used by data ingest engine 140) such that query expression processor 270 may limit searching to buckets in distributed file system 170 with the same hash value.

Configuration manager 250 of HCL provider 150 may include information required to allow HCL provider 150 to connect to different resources of data storage system 120, such as addresses and/or ports for HCL web server 130, application database 160, distributed file system 170, query expression processor 270, etc. According to an implementation, configuration files may be provided to configuration manager 250 for integrating HCL provider 150 with other components of data storage system 120.

Query expression processor 270 may receive the query expression from HCL provider 150 and access distributed file system 170 to retrieve the data that is requested in the query expression. In one implementation, query expression processor 270 may be a HIVE processor. Based on the hash value in query expression, query expression processor 270 may search only buckets in distributed file system 170 with a matching hash value. Query expression processor 270 may return the retrieved data (e.g., the data responsive to the query) to HCL provider 150.

When the data transfer from query expression processor 270 to processing thread 244 is complete, HCL provider 150 may export the retrieved data as an external table data file 280 that is accessible to application database 160. External table data file 280 is used by HCL web server 130 to display to the user the results. HCL web server 130 may pull query results from application database 160 using results program 216 to present the query results to the user.

Although FIG. 2 shows exemplary components of data storage system 120, in other implementations, data storage system 120 may include fewer components, different components, additional components, or differently arranged components than depicted in FIG. 2.

Figure 3:
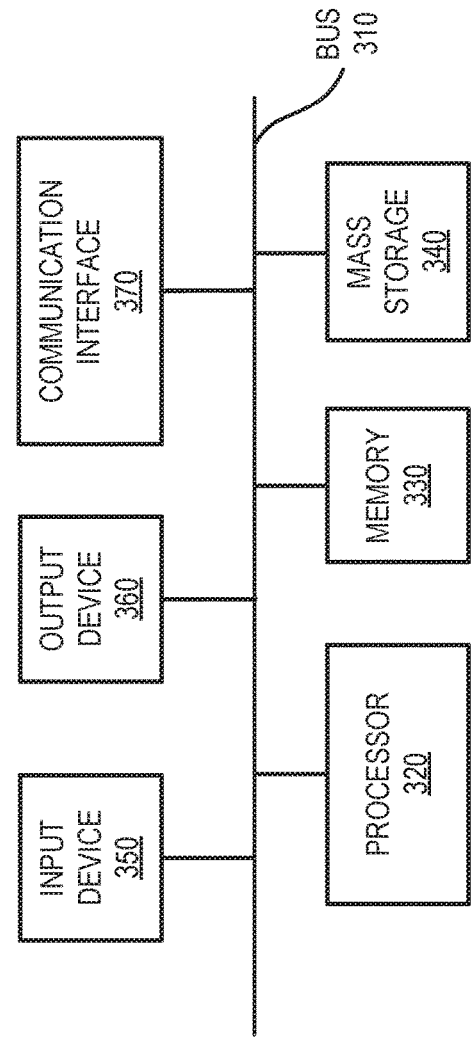
FIG. 3 is a diagram illustrating exemplary components of a network element that may correspond to one or more of the components/devices illustrated and described herein.

FIG. 3 is a block diagram showing exemplary components of a network element 300, according to an embodiment. One or more of data ingest engine 140, HCL web server 130, HCL provider 150, and query expression processor 270 may be implemented as a network element 300. Network element 300 may include a bus 310, a processor 320, a memory 330, mass storage 340, an input device 350, an output device 360, and a communication interface 370.

Bus 310 includes a path that permits communication among the components of network element 300. Processor 320 may include any type of single-core processor, multi-core processor, microprocessor, latch-based processor, and/or processing logic (or families of processors, microprocessors, and/or processing logics) that interprets and executes instructions. In other embodiments, processor 320 may include an application-specific integrated circuit (ASIC), a field-programmable gate array (FPGA), and/or another type of integrated circuit or processing logic. For example, processor 320 may be an x86 based CPU, and may use any operating system, which may include varieties of the Windows, UNIX, and/or Linux. Processor 320 may also use high-level analysis software packages and/or custom software written in any programming and/or scripting languages for interacting with other network entities that are communicatively coupled to network element 300. Processor 320 may perform an operation and/or a process based on various techniques including, for example, multithreading, parallel processing, pipelining, interleaving, etc.

Memory 330 may include any type of dynamic storage device that may store information and/or instructions, for execution by processor 320, and/or any type of non-volatile storage device that may store information for use by processor 320. For example, memory 330 may include a RAM or another type of dynamic storage device, a ROM device or another type of static storage device, and/or a removable form of memory, such as a flash memory. Mass storage device 340 may include any type of on-board device suitable for storing large amounts of data, and may include one or more hard drives, solid state drives, and/or various types of arrays.

Input device 350, which may be optional, can allow an operator to input information into network element 300, if required. Input device 350 may include, for example, a keyboard, a mouse, a pen, a microphone, a remote control, an audio capture device, an image and/or video capture device, a touch-screen display, and/or another type of input device. In some embodiments, network element 300 may be managed remotely and may not include input device 350. Output device 360 may output information to an operator of network element 300. Output device 360 may include a display, a printer, a speaker, and/or another type of output device. In some embodiments, network element 300 may be managed remotely and may not include output device 360.

Communication interface 370 may include a transceiver and one or more antennas that enable network element 300 to communicate within network environment 100 with other devices and/or systems. The communication interface 370 may be configured for wireless communications (e.g., radio-frequency (RF), infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 370 may include a transmitter that converts baseband signals to RF signals and/or a receiver that converts RF signals to baseband signals.

As described herein, network element 300 may perform certain operations relating to, storing, searching, and presenting of historical data. Network element 300 may perform these operations in response to processor 320 executing software instructions contained in a computer-readable medium, such as memory 330 and/or mass storage 340. A computer-readable medium may be defined as a non-transitory memory device. A non-transitory memory device may include memory space within a single physical memory device or spread across multiple physical memory devices. The software instructions may be read into memory 330 from another computer-readable medium or from another device. The software instructions contained in memory 330 may cause processor 320 to perform processes described herein, such as, for example, processes 500 and 600 depicted in FIGS. 5 and 6, respectively. Alternatively, hardwired circuitry may be used in place of, or in combination with, software instructions to implement processes described herein. Thus, implementations described herein are not limited to any specific combination of hardware circuitry and software.

Although FIG. 3 shows exemplary components of network element 300, in other implementations, network element 300 may include fewer components, different components, additional components, or differently arranged components than depicted in FIG. 3.

Figure 4:
FIG. 4 is a simplified illustration of a historical call record data structure that may be used in a distributed file system, according to implementations described herein.

FIG. 4 is a simplified illustration of a historical call record (HCR) data structure 400 that may be used in distributed file system 170. A separate HCR data structure 400 may be used for each call record type. Referring to FIG. 4, HCR data structure 400 may include multiple date partitions 410-1 through 410-x, with each date partition 410 including hash value partitions 420 and a variety of call records 430 associated with each of partitions 420. HCR data is illustrated in tabular form merely for the sake of description. HCR data may be implemented in a data structure different from a table, such as a flat file, a database, or another data structure.

Each date partition 410 may include, for example, a calendar date, which may correspond to a date that a call record was created. According to one implementation, distributed file system 170 may include a different date partition 410 for each day of a calendar year (e.g., date partition 410-x, where x=365). Hash value partition 420 may include, for example, a numerical value derived from a hash function applied to a field of call record data, such as an MDN or IP address associated with a caller. Depending on the hash value used, the number of hash value partitions 420 within each date partition 410 may be between 2 and 2048 or more. The number of hash value partitions 420 may represent the number of data buckets for a particular call record type.

As describe above in connection with FIG. 2, HCL provider 150 may provide a query expression to query expression processor 270 that instructs query expression processor 270 to search only hash value partitions 420 (or buckets) that correspond to a particular hash value for each relevant data in a query. For example, assuming a user submits a search for voice calls from a particular MDN over the preceding year, HCL provider 150 may determine a hash value based on the MDN and direct query expression processor 270 to search the corresponding hash value partition 420 for each of the 365 date partitions 410 in distributed file system 170.

Although FIG. 4 shows an exemplary HCR data structure 400, in other implementations, HCR data structure 400 may include different partitions, fewer partitions, or additional partitions than depicted in FIG. 4.

Figure 5:
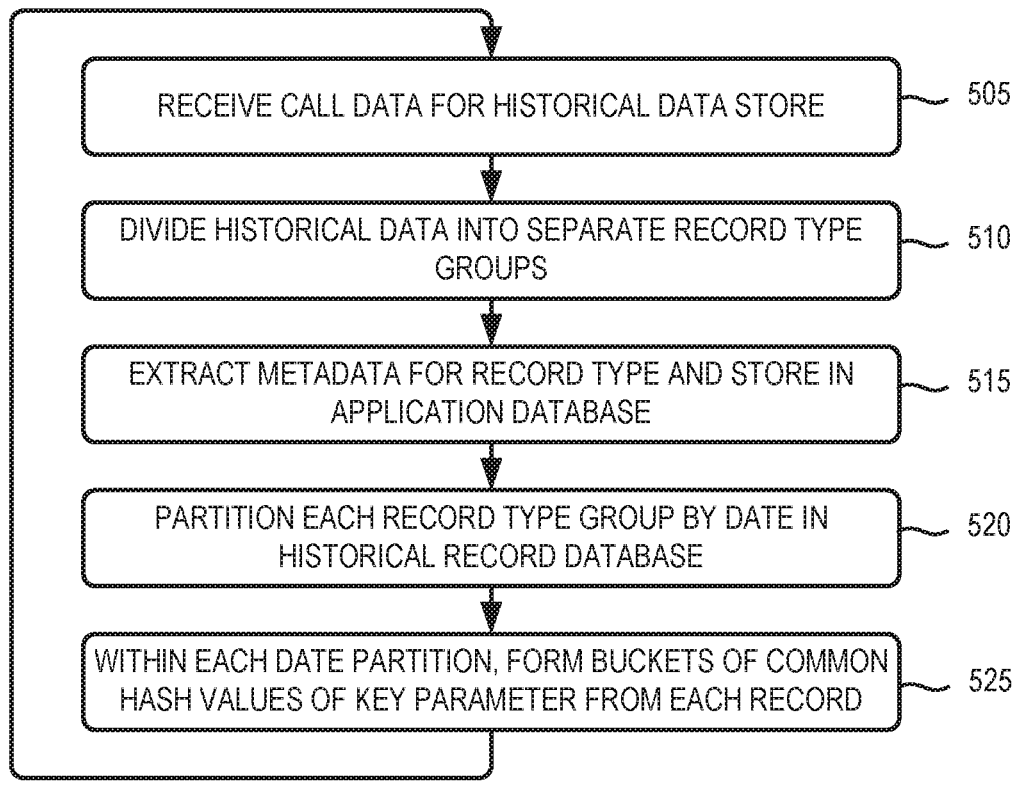
FIG. 5 is a flow diagram illustrating an exemplary process for ingesting data for historical call lookups, according to implementations described herein.

FIG. 5 is a flow diagram illustrating an exemplary process 500 for ingesting data for historical call lookups, according to an implementation described herein. In one implementation, process 500 may be implemented by data ingest engine 140. In another implementation, process 500 may be implemented by data ingest engine 140 in conjunction with one or more other network devices of data storage system 120.

Referring to FIG. 5, process 500 may include receiving call data for a historical data store (block 505), and dividing the historical data into separate record type groups (block 510). For example, data ingest engine 140 may receive a download of call records from a core network (e.g., core network 190). Call records may include multiple record types and may include call records over a time period (e.g., a partial day, one day, or multiple days). Data ingest engine 140 may separate (or keep separate) the call records by record type. Different record types may include, for example, voice calls, text messages, data sessions, etc.

Process 500 may further include generating metadata for each record type and storing the metadata in an application database (block 515). For example, data ingest engine 140 may identify fields and/or field constraints associated with each record type. Data ingest engine 140 may associate the fields and/or field constraints with the record type for future searches. Data ingest engine 140 may store the fields and/or field constraints with other call record type metadata in application database 160.

Process 500 may also include partitioning each record type group by date in a historical record database (block 520) and forming buckets, within each date partition of common hash values of key parameter from each record (block 525). For example, data ingest engine 140 may partition data by calendar date, such that each date within each record type group can be searched separately in distributed file system 170. With each date, data ingest engine 140 may hash subscriber phone numbers (e.g., MDN), IP address, device identifiers, subscriber account numbers, or another key parameter with each record to generate a hash value. Call records may then be grouped into hash groups according to hash value within each date. In one implementation, a separate group is used for each hash value. The hash function used by data ingest engine 140 may be different for different record types. In one implementation, the hash function may be selected so that the number of hash values/hash groups is sufficient to limit the data size of each group to provide a low-latency search (e.g., no larger than the configurable block size used in distributed file system 170, which may be in the order of 500 MB). In another implementation, the data size may be limited to about one GB (e.g., assuming use of a 1 GB block size for distributed file system 170). In exemplary implementations, each hash group may represent less than one ten-thousandth of the total data historical data set. According to one implementation, each hash group may be stored in a separately searchable APACHE HIVE table.

Figure 6:
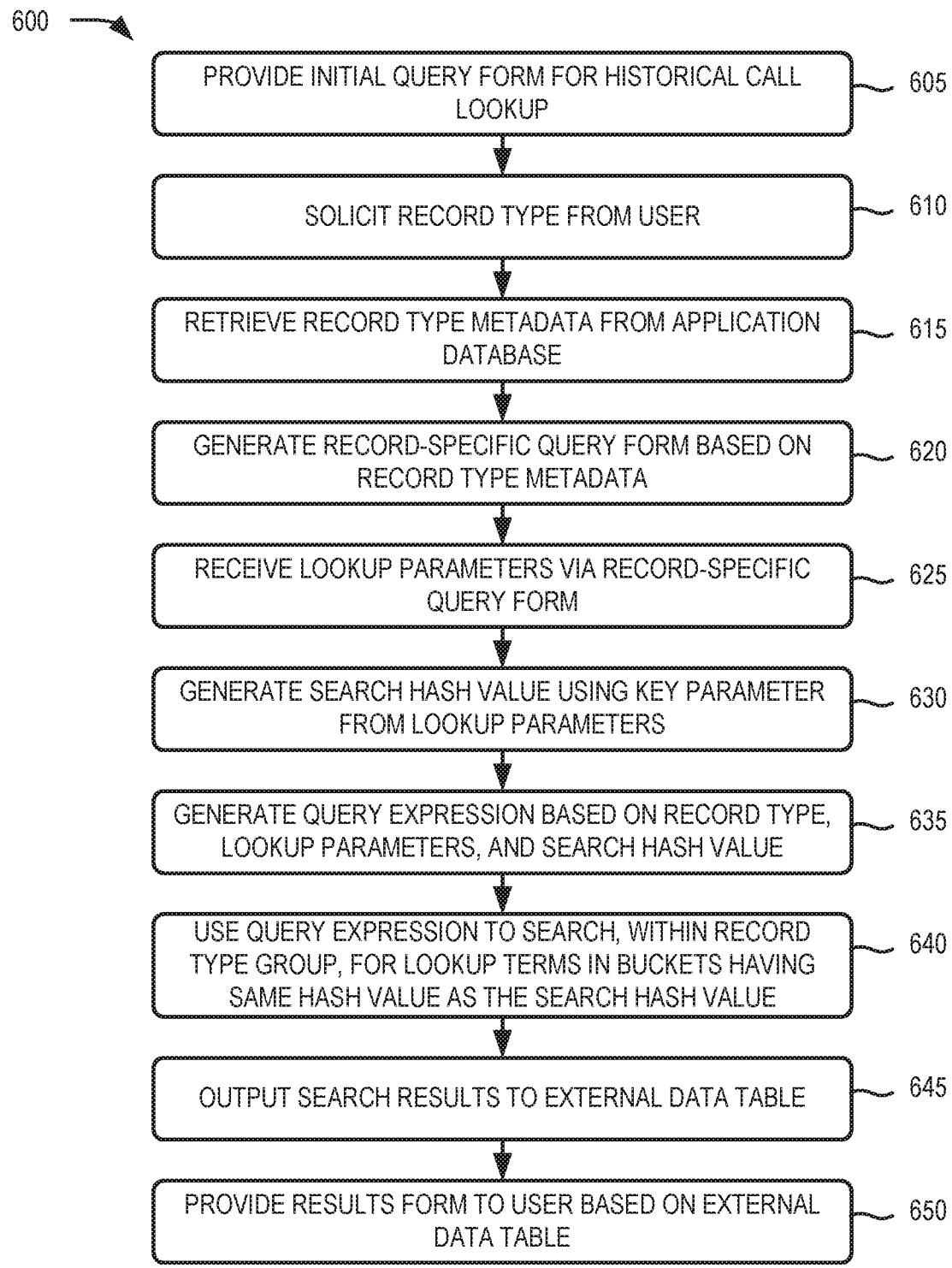
FIG. 6 is a flow diagram illustrating an exemplary process for performing historical call lookups, according to implementations described herein.

FIG. 6 is a flow diagram illustrating an exemplary process 600 for performing historical call lookups, according to an implementation described herein. In one implementation, process 600 may be implemented by HCL provider 150. In another implementation, process 500 may be implemented by HCL provider 150 in conjunction with HCL web server 130 and/or another network device of data storage system 120.

Referring to FIG. 6, process 600 may include providing an initial query form for a historical call lookup (block 605), and soliciting a record type from a user (block 610). For example, a user may access HCL web server 130 via user device 110 and request an historical call lookup. HCL web server 130 may first provide a user interface requesting the user provide a call record type. In one implementation, HCL web server 130 may provide a structured form, such as a pull-down menu of available call record types, to solicit a user selection.

Process 600 may also include retrieving record type metadata from an application database (block 615), generating a record-specific query form based on the record type metadata (block 620), and receiving lookup parameters via the record-specific query form (block 625). For example, HCL web server 130 may receive a selected record type from the user and, in response, retrieve record-type reference data for the selected record type from application database 160. Using the record-type reference data, HCL web server 130 may generate a query page dynamically for the selected call record type. Using the query page, a user may enter lookup parameters, such as search terms, date ranges, and/or other search parameters relevant to particular fields of the selected call record type.

Process 600 may further include generating a search hash value using a key parameter from the lookup parameters (block 630). For example, HCL web server 130 may provide the search parameters to HCL provider 150, which may apply the ingest hash function to a key parameter (e.g., an MDN of the caller, IP address of the caller, etc.) of the search parameters provided by the user. Application of the ingest hash function may provide a search hash value.

Process 600 may additionally include generating a query expression based on the record type, lookup parameters, and the search hash value (block 635), and using the query expression to search, within the record type group, for lookup terms in buckets having same hash value as the search hash value (block 640). For example, HCL provider 150 may generate a query expression with a search hash value based on the ingest hash function such that query expression processor 270 may limit searching to buckets in distributed file system 170 with the same hash value for each applicable date. Query expression processor 270 may execute the query expression to search, within the record type group of the historical data store, using hash elimination to exclude buckets having different hash values than the search hash value.

Process 600 may also include outputting the search results to an external data table (block 645), and providing a results form to the user based on the external data table (block 650). For example, HCL provider 150 may receive the query results from query expression processor 270 and provide them as external table data files 280. HCL web server 130 may use record-type reference data from application database 160 to format and present the search results to a user.

Systems and methods described herein provide facilitate the search and presentation of historical data for wired and/or wireless network usage and provide a mechanism for high-redundancy, low-latency record retrieval of data from large data sets. A generic framework is applied for handling all data types and sizes. Data storage and retrieval systems described herein may be infinitely scalable, consuming the same amount of resources for searching regardless of data size by enabling hash elimination to exclude segments with mathematically impossible results from a search. Thus, search response times are faster than those of traditional relational database systems.

The foregoing description of embodiments provides illustration, but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive.

For example, depending on the call record type, there may be additional call records which need to be queried in addition to the main call records requested. Additional queries for these datasets may run in parallel with the query for the main request. Furthermore, if a user's requested search range goes beyond what is available for hashed data (e.g., beyond the one-year window for historical call data), searching of non-hashed data may be enabled. For a non-hashed data search, each query for hashed data will have a corresponding non-hashed query that runs. The non-hashed query will be nearly the same as the hashed query, but the non-hashed query will exclude the dates available for hashed data so that no duplicate search is performed and no data is duplicated for the end result set.

As set forth in this description and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while series of blocks have been described with regard to the processes illustrated in FIGS. 5 and 6, the order of the blocks may be modified according to other embodiments. Further, non-dependent signals and/or blocks may be performed in parallel. Additionally, other processes described in this description may be modified and/or non-dependent operations may be performed in parallel.

Embodiments described herein may be implemented in many different forms of software executed by hardware. For example, a process or a function may be implemented as "logic," a "component," or an "element." The logic, the component, or the element, may include, for example, hardware (e.g., processor 320, etc.), or a combination of hardware and software.

Embodiments have been described without reference to the specific software code because the software code can be designed to implement the embodiments based on the description herein and commercially available software design environments and/or languages. For example, various types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 320) of a device. A non-transitory storage medium includes one or more of the storage mediums described in relation to memory 330.

To the extent the aforementioned embodiments collect, store or employ personal information of individuals, it should be understood that such information shall be collected, stored and used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction set forth in this description should be construed as critical or essential to the embodiments described herein unless explicitly indicated as such.

All structural and functional equivalents to the elements of the various aspects set forth in this disclosure that are known or later come to be known to those of ordinary skill in the art are expressly incorporated herein by reference and are intended to be encompassed by the claims. No claim element of a claim is to be interpreted under 35 U.S.C. § 112(f) unless the claim element expressly includes the phrase "means for" or "step for."

What is claimed is:

1. A method, comprising:
    dividing, by a first network device, data for a historical data store into separate record type groups;
    storing, by the first network device, metadata for each record type in an application database;
    partitioning, by the first network device, each record type group by date in a historical record database that is different from the application database;
    forming, by the first network device and within each date partition, a plurality of buckets, with each bucket of the plurality of buckets including records having a common hash value of a key parameter from each record;
    soliciting, by a second network device, a record type from a user;
    retrieving, by the second network device, record type metadata from the application database;
    generating, by the second network device, a record-specific query form based on the record type metadata;

receiving, by the second network device and via the record-specific query form, lookup parameters from the user;

generating, by a third network device, a search hash value using a key parameter from the lookup parameters;

generating, by the third network device, a query expression based on the record type, lookup parameters, and the search hash value; and outputting, by the third network device and to a data table, search results based on the query expression.

2. The method of claim 1, providing, by the second network device and to a user device associated with the user, an initial query form for a historical call lookup.

3. The method of claim 1, further comprising:

executing the query expression to search, within the record type group of the historical record database, for terms in the buckets, of the plurality of buckets, having a same hash value as the search hash value.

4. The method of claim 1, further comprising: receiving, by the first network device, the data from a provider associated with a core network, wherein the data includes call records for subscribers.

5. The method of claim 1, further comprising:

extracting, by the first network device and from the data, the metadata for each record type.

6. The method of claim 1, wherein the historical record database includes a distributed file system.

7. The method of claim 6, wherein a data size stored in the historical record database exceeds one petabyte and wherein each bucket of the plurality of buckets is no more than about one gigabyte in size.

8. The method of claim 1, wherein a size of each bucket of the plurality of buckets is less than or equal to a block size of an underlying file system for the historical record database.

9. The method of claim 1, wherein the key parameter used to generate the hash value includes a user device identifier.

10. The method of claim 1, further comprising:

providing, by the second network device, the search results to the user based on the data table.

11. A system, comprising:

a first network device, including a first communications interface configured to receive data from a service provider, one or more first memories to store instructions, and one or more first processors configured to execute the instructions to:

divide data for a historical data store into record type groups, store metadata for each record type in an application database, partition each record type group by date in a historical record database that is different from the application database, and form, within each date partition a plurality of buckets, with each bucket of the plurality of buckets including records having a common hash value of a key parameter from each record;

a second network device, including a second communications interface configured to receive input from a user device, one or more second memories to store instructions, and one or more second processors configured to execute the instructions to:

obtain a record type from a user of the user device, retrieve, based on the obtained record type, record type metadata from the application database, generate a record-specific query form based on the record type metadata, and receive, via the record-specific query form, lookup parameters from the user; and a third network device, including a third communications interface configured to exchange data with the second network device, one or more third memories to store instructions, and one or more third processors configured to execute the instructions to:

generate a search hash value using a key parameter from the lookup parameters, generate a query expression based on the record type, lookup parameters, and the search hash value, and output, to a data table, search results based on the query expression.

12. The system of claim 11, further comprising:

one or more fourth processors configured to execute the query expression to search, within the record type group of the historical data store, for terms in buckets, of the plurality of buckets, having a same hash value as the search hash value.

13. The system of claim 11, wherein the lookup parameters include one or more terms and a date range.

14. The system of claim 11, wherein the one or more second processors are further configured to execute the instructions to:

provide, to the user device, an initial query form for a historical call lookup.

15. The network device of claim 11, wherein the one or more first processors are further configured to execute the instructions to:

receive the data from a service provider, wherein the data includes call records for subscribers, and extract, from the data, the metadata for each record type.

16. The system of claim 11, wherein a size of each bucket of the plurality of buckets is less than or equal to a block size of an underlying file system for the historical record database.

17. The system of claim 11, wherein the key parameter includes one of a mobile directory number (MDN) for a user device or an Internet Protocol (IP) address.

18. A non-transitory computer-readable medium, storing instructions executable by one or more processors, the non-transitory computer-readable medium comprising one or more instructions to:

divide call data for a historical data store into separate record type groups;

store metadata for each record type in an application database;

partition each record type group by date in a historical record database that is different from the application database;

form, within each date partition, a plurality of buckets, with each bucket of the plurality of buckets including call records having a common hash value of a key parameter from each call record;

obtain a record type from a user of a user device;

retrieve record type metadata from the application database;

generate a record-specific query form based on the record type metadata;

receive, via the record-specific query form, lookup parameters from the user;

generate a search hash value using a key parameter from the lookup parameters;

generate a query expression based on the record type, lookup parameters, and the search hash value; and output, to a data table, search results based on the query expression.

19. The non-transitory computer-readable medium of claim 18, further comprising one or more instructions to:
   execute the query expression to search, within the record type group of the historical record database, using hash elimination to exclude buckets, of the plurality of buckets, having different hash values than the search hash value.

20. The non-transitory computer-readable medium of claim 18, further comprising one or more instructions to:
   provide the search results to the user based on the record type metadata.

\* \* \* \* \*